US009467506B2

(12) United States Patent
Kontothanassis et al.

(10) Patent No.: US 9,467,506 B2
(45) Date of Patent: Oct. 11, 2016

(54) ANYCAST BASED, WIDE AREA DISTRIBUTED MAPPING AND LOAD BALANCING SYSTEM

(71) Applicant: Google Inc., Mountain View, CA (US)

(72) Inventors: Leonidas Kontothanassis, Lexington, MA (US); David Presotto, Palo Alto, CA (US); Ankur Jain, Mountain View, CA (US)

(73) Assignee: Google Inc., Mountain View, CA (US)

( * ) Notice: Subject to any disclaimer, the term of this patent is extended or adjusted under 35 U.S.C. 154(b) by 249 days.

(21) Appl. No.: 14/164,925

(22) Filed: Jan. 27, 2014

(65) Prior Publication Data

US 2015/0215388 A1 Jul. 30, 2015

(51) Int. Cl.
*G06F 15/173* (2006.01)
*H04L 29/08* (2006.01)
*H04L 29/12* (2006.01)

(52) U.S. Cl.
CPC ....... *H04L 67/1002* (2013.01); *H04L 61/1511* (2013.01); *H04L 67/1008* (2013.01); *H04L 61/2069* (2013.01); *H04L 67/1017* (2013.01); *H04L 67/1019* (2013.01); *H04L 67/1027* (2013.01)

(58) Field of Classification Search
None
See application file for complete search history.

(56) References Cited

U.S. PATENT DOCUMENTS

| 7,346,676 | B1 * | 3/2008 | Swildens | H04L 67/1008 709/223 |
|---|---|---|---|---|
| 8,521,879 | B1 | 8/2013 | Pena et al. | |
| 2005/0198335 | A1 * | 9/2005 | Brown | H04L 67/1014 709/229 |
| 2008/0235400 | A1 * | 9/2008 | Slocombe | H04L 29/06 709/245 |
| 2009/0054091 | A1 * | 2/2009 | van Wijk | H04L 67/24 455/466 |
| 2009/0327489 | A1 * | 12/2009 | Swildens | G06F 9/505 709/224 |
| 2010/0131663 | A1 * | 5/2010 | Lee | H04L 29/12216 709/228 |
| 2011/0153941 | A1 | 6/2011 | Spatscheck et al. | |
| 2012/0054276 | A1 * | 3/2012 | Chaturvedi | H04L 67/1046 709/204 |
| 2012/0300775 | A1 | 11/2012 | Swanson et al. | |
| 2013/0019311 | A1 | 1/2013 | Swildens et al. | |

FOREIGN PATENT DOCUMENTS

| EP | 1 368 947 B1 | 12/2003 |
|---|---|---|
| EP | 2 398 211 A2 | 12/2011 |

(Continued)

OTHER PUBLICATIONS

International Search Report and Written Opinion mailed Mar. 25, 2015 in PCT Application No. PCT/US2015/011213.

*Primary Examiner* — Kristie Shingles
*Assistant Examiner* — Mohammad Yousuf A Mian
(74) *Attorney, Agent, or Firm* — McDermott Will & Emery (57) ABSTRACT

This disclosure provides systems, methods, and apparatus for providing anycast based load balancing for a plurality of servers within a network. The network includes a domain name system (DNS) server that is configured to respond to domain name queries received from one or more clients. The DNS server maintains a set of anycast IP addresses associated with a domain name. The DNS server responds to a client's request with one or more selected anycast IP addresses from the set of anycast IP addresses. The DNS server also instructs a plurality of content servers to advertise all of the anycast IP addresses to the network. The DNS server also receives load information from each of the plurality of content servers, and instructs, based on the load information, one of the plurality of content servers to cease advertising one or more of the previously advertised anycast IP addresses.

20 Claims, 9 Drawing Sheets

(56) References Cited

FOREIGN PATENT DOCUMENTS

| JP | 05-255653 B2 | 8/2013 |
| WO | WO-01/18641 A1 | 3/2001 |
| WO | WO-01/39470 A1 | 5/2001 |
| WO | WO-03/081450 A1 | 10/2003 |

* cited by examiner

ANYCAST BASED, WIDE AREA DISTRIBUTED MAPPING AND LOAD BALANCING SYSTEM

TECHNICAL FIELD

This disclosure relates to the field of communication networks, and in particular distributed mapping and load balancing within communication networks.

DESCRIPTION OF THE RELATED TECHNOLOGY

In some systems, such as domain name server (DNS) systems, it may be difficult to determine the real location of the user sending the request. When a user sends a DNS request, the request is first sent to a domain name resolver. The domain name resolver, in turn, sends a request to a domain name server to obtain a network address (of a content server) associated with the domain name. This network address is sent to the user for accessing the desired content. For some distributed systems, a single address may correspond to multiple geographically separated servers.

SUMMARY

According to one aspect, the subject matter described in this disclosure can be implemented in a method for balancing load over a set of content servers from a domain name system (DNS) server. The method includes receiving a request for a network address of a content server, responding to the request with a network address selected from a plurality of anycast network addresses, receiving load information from at least one of a plurality of content servers, and instructing, based on the received load information, one or more over-loaded content servers to cease advertising one or more of the plurality of anycast network addresses.

According to another aspect, the subject matter described in this disclosure can be implemented in a method for responding to communications received at a server from one or more client computers within a network. The method includes receiving a plurality of anycast network addresses from a domain name system (DNS) server, advertising the plurality of anycast network addresses to a network, sending load information to the DNS server, and ceasing to advertise one or more of the plurality of anycast network addresses based on instructions received from the DNS server.

According to another aspect, the subject matter described in this disclosure can be implemented in a domain name system (DNS) including a DNS server and a plurality of content servers capable of communicating with the DNS server. The DNS server includes an anycast module and a load balancing module. The anycast module is configured to accept a request for a network address of a content server, and to respond to the request with a network address selected from a plurality of anycast network addresses. The load balancing module, communicably coupled to the anycast module, is configured to receive load information from at least one of a plurality of content servers, to identify an over-loaded content server based on the load information, and to instruct the over-loaded content server to cease advertising one or more of the plurality of anycast network addresses. Each of the plurality of content servers includes an advertising module and a load monitoring module. The advertising module is configured to receive instructions from the DNS server to advertise specified ones of the plurality of anycast network addresses, and advertise the specified ones of the plurality of anycast network addresses. The load monitoring module is configured to collect load information associated with the server, and to communicate the load information to the DNS server.

According to another aspect, the subject matter described in this disclosure can be implemented in a non-transitory computer readable storage medium having instructions encoded thereon, which when executed by a processor cause the processor to perform a method. The method includes receiving a request for a network address of a content server, responding to the request with a network address selected from a plurality of anycast network addresses, receiving load information from at least one of a plurality of content servers, and instructing, based on the received load information, one or more over-loaded content servers to cease advertising one or more of the plurality of anycast network addresses.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
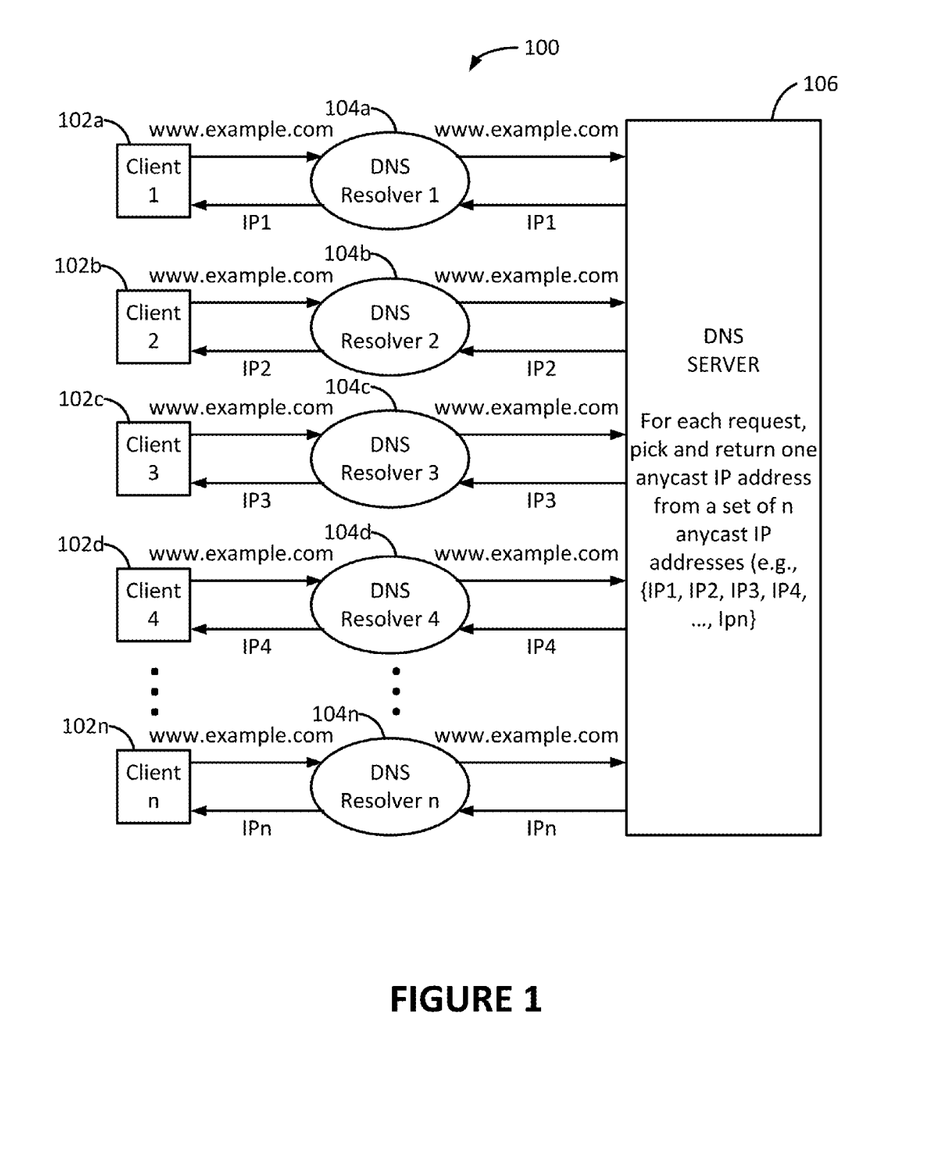
FIG. 1 shows an example domain name system.

FIG. 1 shows an example domain name system 100. In particular, FIG. 1 shows a plurality of clients: client-1 102a, client-2 102b, client-3 102c, client-4 102d, . . . , client-N 102n communicatively coupled to a plurality of domain name system (DNS) resolvers: DNS Resolver-1 104a, DNS Resolver-2 104b, DNS Resolver-3 104c, DNS Resolver-4 104d, . . . , DNS Resolver-N 104n, respectively. Each DNS Resolver 104a-104n can communicate with a DNS server 106.

The plurality of clients 102a-102n can include any computing device capable of communicating over a network, such as, but not limited to, a personal computer, laptop, a smart-phone, a tablet computer, etc. While each of the plurality of clients 102a-102n is shown to communicate with its relative DNS Resolver 104a-104n, it is understood that more than one of the plurality of clients 102a-102n can communicate with the same DNS resolver. For example, client-2 102b, shown to be communicating with the DNS Resolver-2 104b may instead communicate with the DNS Resolver-4 104d.

Each of the plurality of clients 102a-102n can send domain name resolution requests to their respective DNS Resolver 104a-104n. For example, client-1 102a sends a domain name address "www.example.com" to the DNS Resolver-1 104a. The DNS Resolvers 104a-104n can be applications that use DNS queries to query for information regarding domain names from servers. For example, the DNS Resolver-1 104a can query the DNS server 106 for the IP address of a content server associated with the domain name address such as "www.example.com." The DNS server 106, in turn, responds by returning to the DNS resolver 104a one or more IP addresses of the content servers associated with the domain name address "www.example.com."

In some implementations, the DNS Resolvers 104a-104n may be geographically proximate to their respective clients 102a-102n. In some implementations, the DNS Resolvers 104-104n may reside on their respective client 102a-102n. In some other implementations, the DNS Resolvers 104a-104n may reside on the respective client's 102a-102n internet service provider's gateway. In some implementations, the DNS Resolvers 104a-104n may recursively query one or more DNS servers to acquire the IP address of the domain name address requested by the clients 102a-102n. In some other implementations, the clients 102a-102n may send queries directly to the DNS server 106, instead of directing the queries via their associated DNS Resolvers 104a-104n.

As mentioned above, the DNS server 106 responds to communications such as domain name address queries received from the of DNS resolvers 104a-104n or from the clients 102a-102n. The DNS server 106 can respond by providing the requested information, i.e., the IP address of the requested domain name, provide a pointer to another server that can help resolving the requested domain name, or respond with an error message indicating that the DNS server 106 does not have any information associated with the query.

In some implementations, the DNS server 106 may be an authoritative DNS server for a contiguous portion of a DNS namespace. A DNS server can be authoritative for a contiguous portion of the DNS namespace if the DNS server has information related to that portion of the namespace. For example, in some implementations, the DNS server 106 may be authoritative for the "www.example.com" namespace. In such implementations, the DNS server 106 may include resource records in a DNS database. The resource records can include IP addresses of one or more web servers associated with "www.example.com."

In some other implementations, the IP address returned by the DNS server 106 can be an IP address of another DNS server. In some such implementations, the DNS server 106 may not be an authoritative server for the requested domain name, and may return an IP address of a forwarder DNS server, which resolves domain names on behalf of the DNS server 106.

The domain name server may determine the location of the user based on the location of the domain name resolver, and send the network address of a content server that is nearest to the domain name resolver and that can handle the additional load. But, users from significantly different geographies may use the same domain name resolver to resolve the domain name. This means that the content server whose network address was sent by the domain name server may not be the nearest content server to the user. Thus, while the domain name server may be able to balance the load across the set of distributed content servers the domain name server may fail to provide the most appropriate content server to the user.

Anycast provides the ability to direct requests from users to content servers that are the most proximate to the users. With anycast, a server, such as a domain name server, responds to the request from the domain name resolver with an anycast address. In addition, each of the geographically distributed content servers advertises the same anycast address. Thus, when the user uses the anycast address as the address from where to access content, intermediate routers automatically route the user's request to the nearest (or lowest cost) content server. But requests from the user would be routed to the same nearest content server regardless of the load on the server. In other words, anycast is not load aware. Thus while anycast provides the ability to direct user requests to the most appropriate content server, anycast does not have the ability to balance the load across the set of distributed content servers.

In some implementations, the DNS server 106 can maintain a plurality of anycast IP addresses associated with a domain name address. For example, the DNS server 106 can maintain a set of n anycast IP addresses {IP1, IP2, IP3, IP4, . . . , IPN} associated with the domain name address "www.example.com." In some implementations, n can have a value of about 100 to about 200. In some other implementations, n can have a value of about 10 to about 100, about 200 to about 300, or even values greater than 300. The DNS server 106, for each received query for the domain name address, returns a subset of anycast IP addresses selected from the plurality of anycast IP addresses. For example, in some implementations, in response to the query for "www.example.com" received from the DNS Resolver-1 104a (and originating from client-1 102a), the DNS server 106 can return one anycast IP address: the anycast IP address IP1, selected form the set of n anycast IP addresses. The DNS server 106 returns anycast IP address IP2 upon receiving the next query for "www.example.com" from the DNS Resolver-2 104b. Similarly, upon receiving subsequent queries for "www.example.com" from the DNS Resolver-3 104c, the DNS Resolver-4 104d, . . . , DNS Resolver-n 104n, the DNS server 106 returns anycast IP addresses IP3, IP4, . . . , IPn, respectively.

In some implementations, the DNS server 106, for each received query, can return more than one anycast IP address selected from the n anycast IP addresses associated with the domain name. For example, in response to the query for "www.example.com" received from the DNS Resolver-1 104a, the DNS server 106 can return anycast IP addresses IP1, IP2, IP3, and IP4 selected from the anycast IP addresses IP1, IP2, IP3, IP4, IP5, . . . , IPn. The client can then select one anycast IP address from the received subset of anycast IP addresses to request content from the content servers.

In some implementations, for each received query the DNS server 106 can select the subset of anycast IP address from the set of n anycast IP addresses in a round-robin or other structured fashion and respond to the query with the selected anycast IP address. In some other implementations, the DNS server 106 may randomly or pseudo-randomly select an anycast IP address from the set of n anycast IP addresses.

Figure 2:
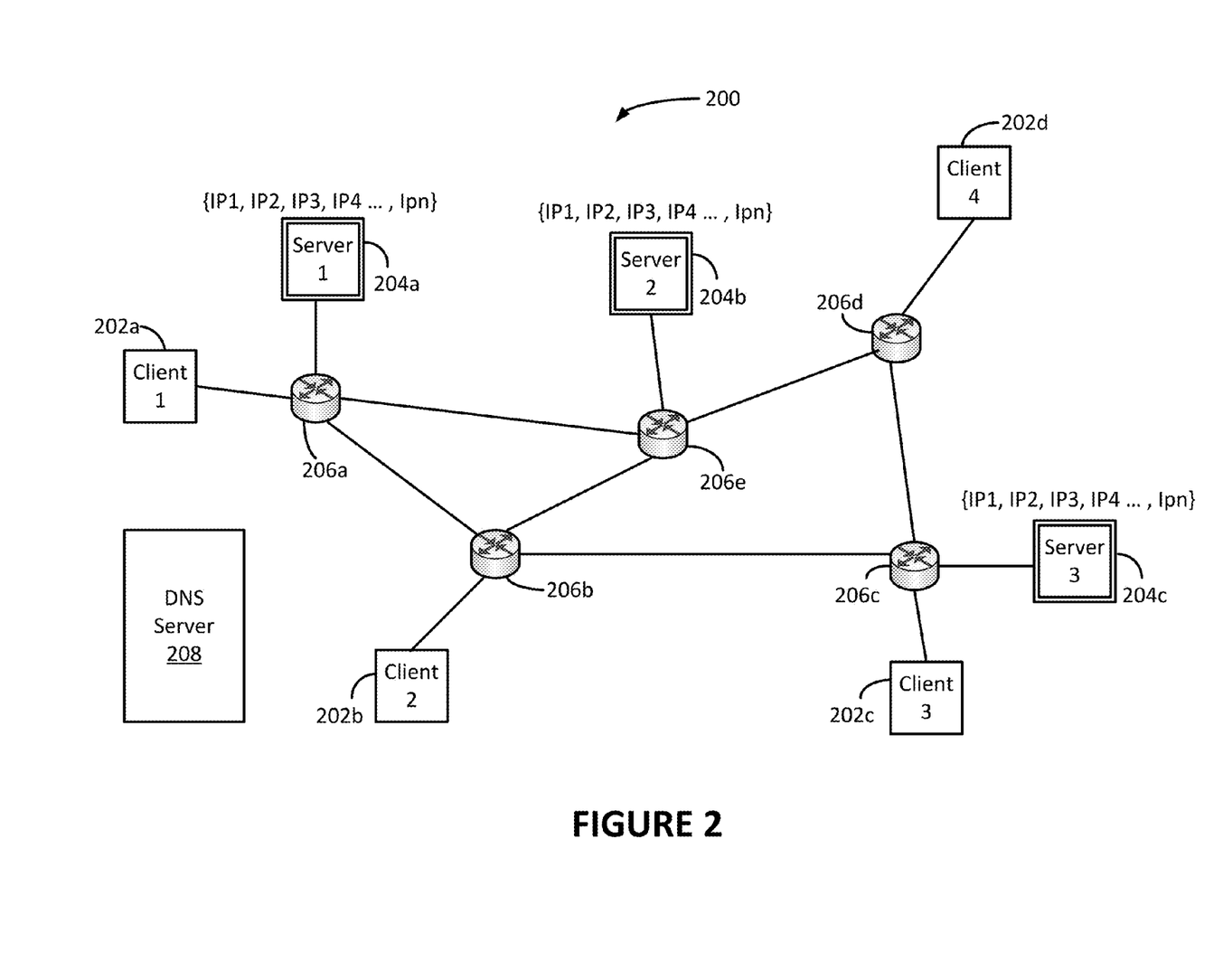
FIG. 2 shows an example network for illustrating anycast based load balancing.

FIG. 2 shows an example network 200 for illustrating anycast based load balancing. In particular, FIG. 2 shows four clients: client-1 202a, client-2 202b, client-3 202c, and client-4 202d and three servers: server-1 204a, server-2 204b, and server-3 204c communicating via five IP routers:

router-1 206*a*, router-2 206*b*, router-3 206*c*, router-4, 206*d*, and router-5 206*e*. The network 200 also includes a DNS server 208, which can communicate with the four clients and the three servers. It is understood that other networks may include a different number and configuration of clients, servers, and routers, and that the anycast based load balancing discussed below with relation to the example network 200 can be readily implemented in such other networks.

The DNS server 208 can be similar to the DNS server 106 discussed above in relation to FIG. 1. As such, the DNS server 208 can provide anycast IP addresses selected from a set of anycast IP addresses to clients requesting resolution of a domain name address. For example, the DNS serer 208 can provide anycast IP addresses associated with the domain name "www.example.com." In some implementations, the anycast IP addresses provided by the DNS server 208 can be IP addresses of web content servers. In some other implementations, the IP addresses can be IP addresses of other DNS servers assigned to resolve the domain name "www.example.com" on behalf of the DNS server 208.

The DNS server 208 also communicates with each of the three servers: server-1 204*a*, server-2 204*b*, and server-3 204*c* (explicit connections not shown for the sake of clarity). The DNS server 208 provides server-1 204*a*, server-2 204*b*, and server-3 204*c* with a set of anycast IP addresses associated with a domain name. For example, the DNS server 208 can provide a set of anycast IP addresses {IP1, IP2, IP3, IP4, . . . , IPN} associated with the domain name "www.example.com" to each of the three servers: server-1 204*a*, server-2 204*b*, and server-3 204*c*. Each of the three servers can then advertise the complete set of anycast IP addresses. In some implementations, the DNS server 208 can provide the servers 204*a*-204*c* with a plurality of anycast IP addresses associated with other domain names as well.

The DNS server 208 can also receive load metrics from each server. The load metrics can include, for example, server response time, number of hits, resource utilization, latency, server status, etc. As discussed in detail below, based on the load metrics received from each server, the DNS server 208 may instruct the server to cease advertising one or more anycast IP addresses.

The four clients client-1 202*a*, client-2 202*b*, client-3 202*c*, and client-4 202*d* can be similar to the N clients: client-1 102*a*, client-2 102*b*, client-3 102*c*, client-4 102*d*, . . . , client-N 102*n* discussed above in relation to FIG. 1. Furthermore, it is assumed that each of the four clients have received one or more anycast IP addresses from the DNS server 208. For example, it is assumed that client-1 202*a*, client-2 202*b*, client-3 202*c*, and client-4 202*d* have received anycast IP addresses IP1, IP2, IP3, and IP4, respectively, from a DNS server 208.

As mentioned above, each of the three servers: server-1 204*a*, server-2 204*b*, and server-3 204*c* can advertise a set of anycast IP addresses. By advertising the set of anycast IP addresses, each server 204*a*-204*c* indicates that it can accept client requests associated with any one of the advertised IP addresses. Each server 204*a*-204*d* also sends load metrics to the DNS server. As mentioned above, the load metrics can include, for example, server response time, number of hits, resource utilization, latency, server status, etc. Each server 204*a*-204*d* also receives instructions from the DNS server 208 to begin or to cease advertising one or more anycast IP addresses from the set of anycast IP addresses.

Routers 206*a*-206*e* can route network traffic between the clients 202*a*-202*d*, the servers 204*a*-204*d*, and the DNS server 208. In some implementations, the routers 206*a*-206*e* can be IP routers. As such, the routers 206*a*-206*e* route IP packets received at one of their ports to another one of their ports, where the routing is based, in part, on the destination IP address enclosed in the header of the received IP packet. The routers 206*a*-206*e* can receive advertisements from each of the servers 204*a*-204*c*. Based on these advertisements, the routers 206*a*-206*e* can update their respective routing and forwarding tables. In some implementations, the routers 206*a*-206*e* may use border gateway protocol (BGP) for building routing tables and for exchanging routing information. In some other implementations, the routers 206*a*-206*e* may use open shortest path first (OSPF) protocol for building routing tables and exchanging routing information.

Figure 3:
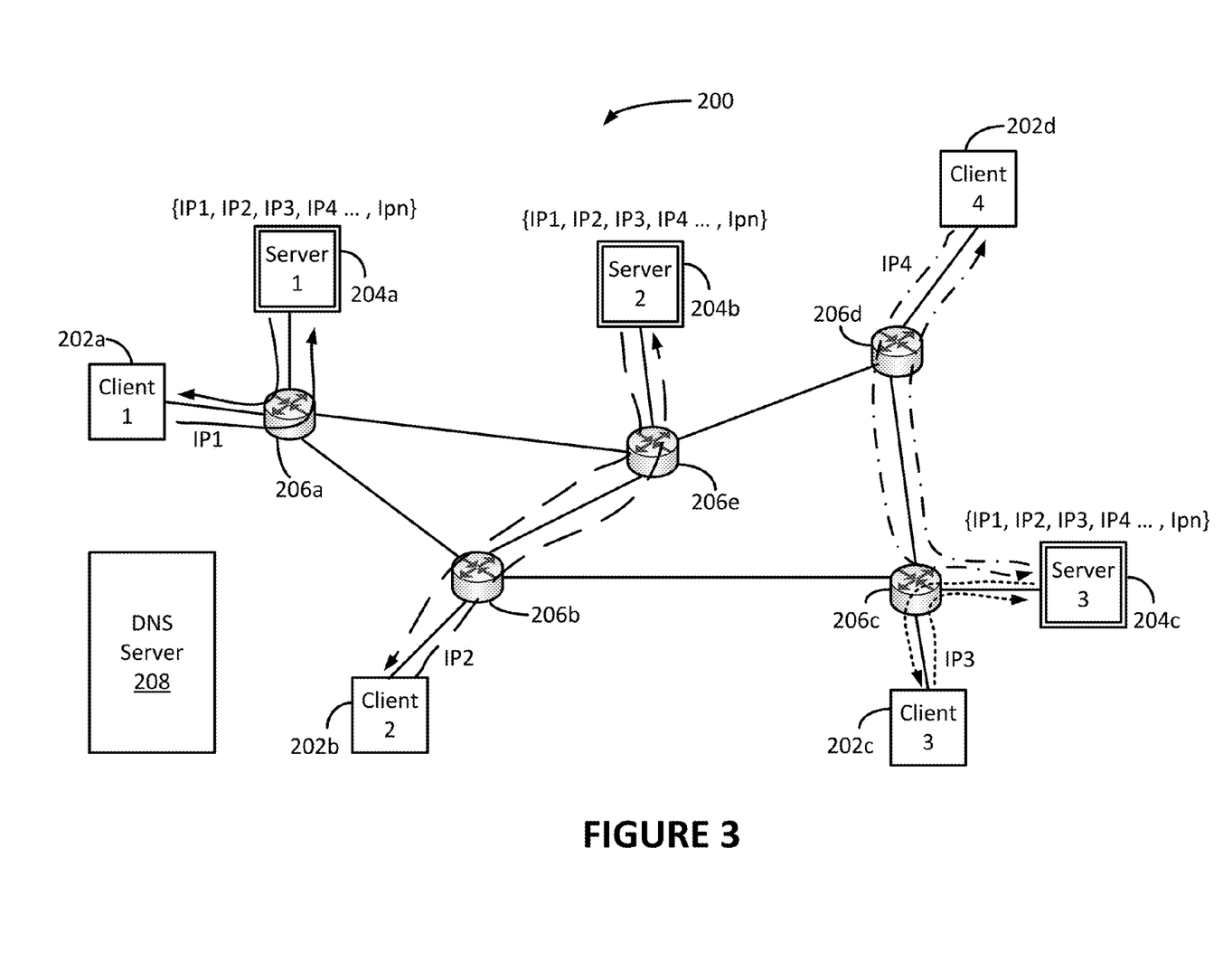
FIG. 3 shows an example routing of network traffic between clients and servers within the network shown in FIG. 2.

FIG. 3 shows an example routing of network traffic between clients 202*a*-202*d* and servers 204*a*-204*c* within the network 200 shown in FIG. 2. In the example shown in FIG. 3, it is assumed that client-1 202*a*, client-2 202*b*, client-3 202*c*, and client-4 202*d* have received IP addresses IP1, IP2, IP3, and IP4, respectively, from the DNS server 208 for their respective requests for the IP address associated with the domain name "www.example.com". Furthermore, it is assumed that each server 204*a*-204*c* advertises the complete set of anycast IP addresses {IP1, IP2, IP3, IP4, . . . , IPN} associated with the domain name "www.example.com" to the routers 206*a*-206*e*.

As all servers 204*a*-204*c* advertise the complete set of anycast IP addresses, each one of the servers 204*a*-204*c* can potentially respond to client requests to any of the advertised anycast IP addresses. In other words, client requests can be potentially processed by any one of the servers 204*a*-204*c*. Which one of the servers 204*a*-204*c* receives the client request may depend on the routing algorithm implemented by the routers 206*a*-206*e*. For example, requests originating from the client-1 202*a* to the address IP1 may be routed to the server-1 204*a* via router-1 206*a*; requests originating from the client-2 202*b* to the address IP2 may be routed to the server-2 204*b* via router-2 206*b* and router-5 206*e*; requests originating from the client-3 202*c* to the address IP3 may be routed to the server-3 204*c* via router-3 206*c*; and requests originating from the client-4 202*d* to the address IP4 may also be routed to the server-3 204*c* via the router-4 206*d* and the router-3 206*c*.

In some implementations, as shown in FIG. 3, responses form the servers 204*a*-204*c* to the client requests may take the same route back to the client as the route taken by the respective request to the servers 204*a*-204*c*. For example, the response by the server-1 204*a* to the client-1 202*a* may be routed via the router-1 206*a*. Similarly, the response from the server-2 206*b* to the client-2 202*b* may be routed via the router-5 206*e* and the router-2 206*b*. It is understood that the routes established between the clients 202*a*-202*d* and the servers 204*a*-204*c* shown in FIG. 3 are only examples, and that these routes may change dynamically based on various factors such as bandwidth, latency, etc. within the network 200.

Figure 4:
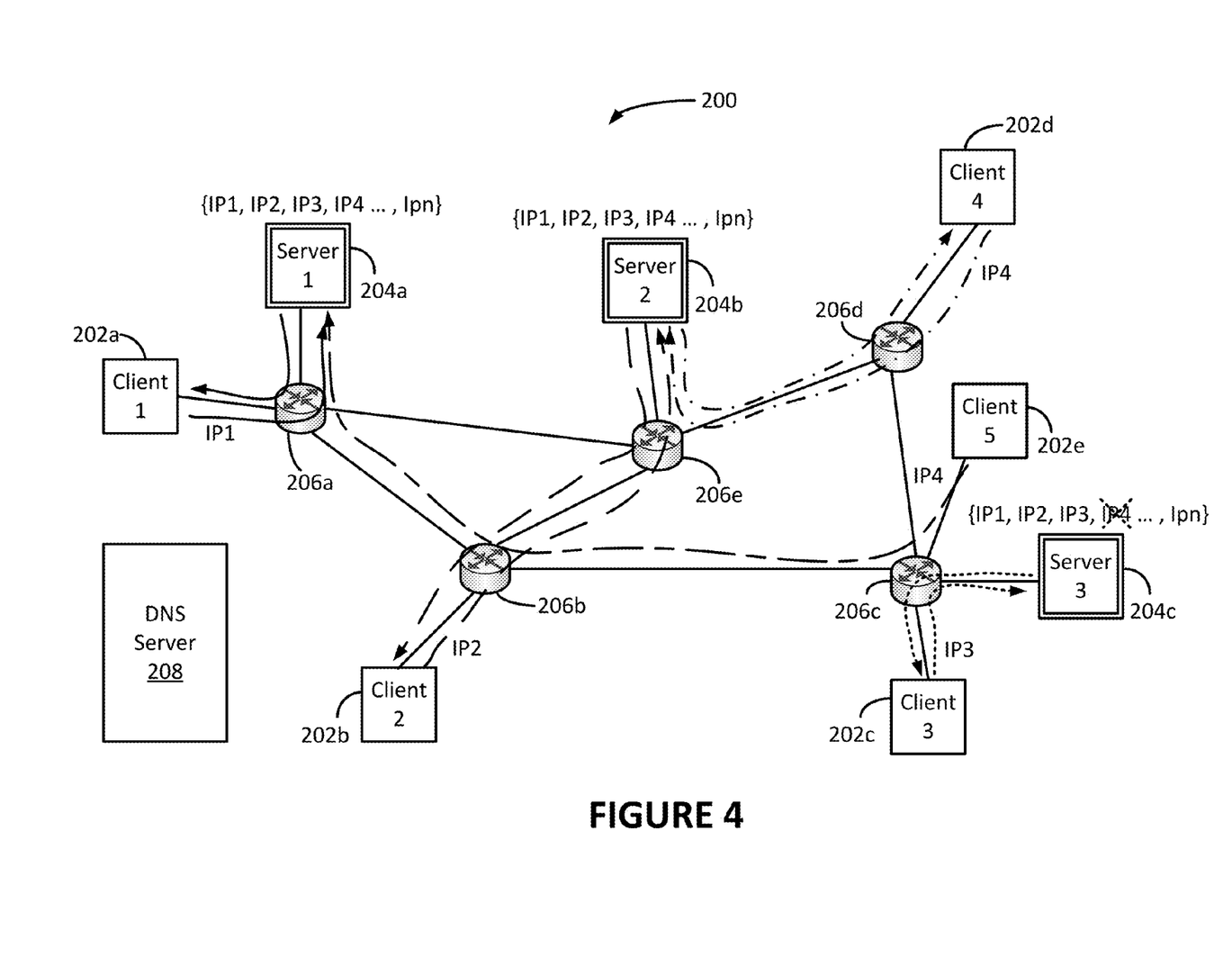
FIG. 4 shows another example routing of network traffic between clients and servers within the network shown in FIG. 2.

FIG. 4 shows another example routing of network traffic between clients 202*a*-202*d* and servers 204*a*-204*c* within the network 200 shown in FIG. 2. In particular, FIG. 4 shows the routing of traffic when the server-3 204*c* is in an over-load condition. As mentioned above, the servers 204*a*-204*c* communicate their respective load information to the DNS server 208. The DNS server 208, based on the received load information, may determine that one or more of the servers 204*a*-204*c* may be in an over-load condition. In such instances, the DNS server 208 may attempt to relieve the load on the affected server by instructing the server to cease to advertise one or more of the set of previously advertised anycast IP addresses.

For example, referring to FIG. 4, the DNS server 208 may determine that server-3 204c is in an over-load condition, and instruct the server-3 204c to cease to advertise the anycast IP address IP4. In some other implementations, the anycast address IP4 may be the address that is causing the highest load on the server-3 204c. In some other implementations, the DNS server 208 may instruct the server-3 24c to cease advertising an address selected randomly from the set of IP anycast addresses.

As server-3 204c cases to advertise IP4, the routers 206a-206e can reconfigure their respective routing or forwarding tables such that IP packets with a destination address of IP4 are no longer routed to the server-3 204c. Instead, IP packets with the destination address of IP4 may be routed to a different server that is still advertising the anycast address IP4. For example, referring to FIG. 4, requests to the anycast IP address IP4 from the client-4 202d that were previously routed to the server-3 204c are instead routed to the server-2 204b, which is still advertising the anycast IP address IP4.

Even if a new client were to send requests to the address IP4, such requests would not be routed to the server-3 204c. For example, FIG. 4 also shows a fifth client: client-5 202e, which is sending requests to the anycast IP address IP4. Even though client-5 202e is coupled to the same router (router-3 206c) to which server-3 204c is coupled, requests to IP4 originating from client-5 202e are not routed to the server-3 204c. Instead, in this example, the requests are routed to server-1 204a.

It should be noted that while server-3 204c ceases to advertise the anycast IP address IP4, it may still continue to advertise other anycast IP addresses, e.g., address IP3. Thus, requests to address IP3 originating from the client-3 202c, or from any other client for that matter, may still be received and processed by the server-3 204c.

As the requests to anycast IP address IP4 that were previously processed by the server-3 204c are no longer received by the server-3 204c, the load on the server-3 204c may be reduced. In this manner, the DNS server 208 can regulate the load on the server-3 204c by instructing the server-3 204c to cease to advertise one or more anycast IP addresses selected from the set of anycast IP addresses. For example, assume that the server-3 204c advertises 20 anycast IP addresses. Also assume that the server-3 204c is under an over-load condition and that the overall load on the server is evenly distributed over processing requests associated with each of the 20 anycast IP addresses. If the server were to cease advertising 2 of the 20 anycast IP addresses while the remaining servers 204 continued to advertise all 20 anycast IP addresses, then communications associated with the 2 anycast IP addresses that would otherwise be directed to server-3 204c would instead be directed to other servers 204 that continue to advertise the addresses. This means that the server-3 204c would have to process approximately 10% fewer communications. Thus, the overall load on the server could potentially be reduced by about 10%. Thus, by instructing a server to cease advertising one or more anycast IP addresses, the load on that server is distributed to other servers. Similarly, the DNS server 208 can monitor the load-conditions on the other servers 204a-204b within the network 200, and may instruct one or more of these servers to cease advertising one or more anycast IP addresses based on their respective load-conditions.

The DNS server 208 can continue to monitor the load-condition on the server-3 204c to determine if the current load-conditions may allow the server-3 204c to re-advertise the anycast IP address IP4. For example, if the load parameters such as, but not limited to, bandwidth and latency, cross a predetermined threshold, then the DNS server 208 may instruct the server-3 204c to re-advertise IP4. Upon receiving the advertisement from the server-3 204c, the routers 206a-206e may reconfigure their routing and forwarding tables such that requests to the address IP4 may again be routed to the server-3 204c.

In some implementations, servers 204a-204c may respond to communications with a client that rely upon a state stored by a respective server based on previous communications with the same client. For example, if server-3 204c receives a TCP/IP communication on the anycast address IP4, then the server-3 204c would have to maintain a TCP state while responding to the communication. As shown in FIG. 4, when the server-3 204c ceases to advertise the address IP4 due to over-load conditions, packets from the client-4 202d addressed to IP4 are routed to the server-2 204b going forward. But server-2 204b does not include any state information with regards to the client-4's 202d communication. Therefore, any state-dependent transaction that was established by the client-4 202d with the server-3 204c would be lost when the packets are routed to the server-2 204b.

Figure 5:
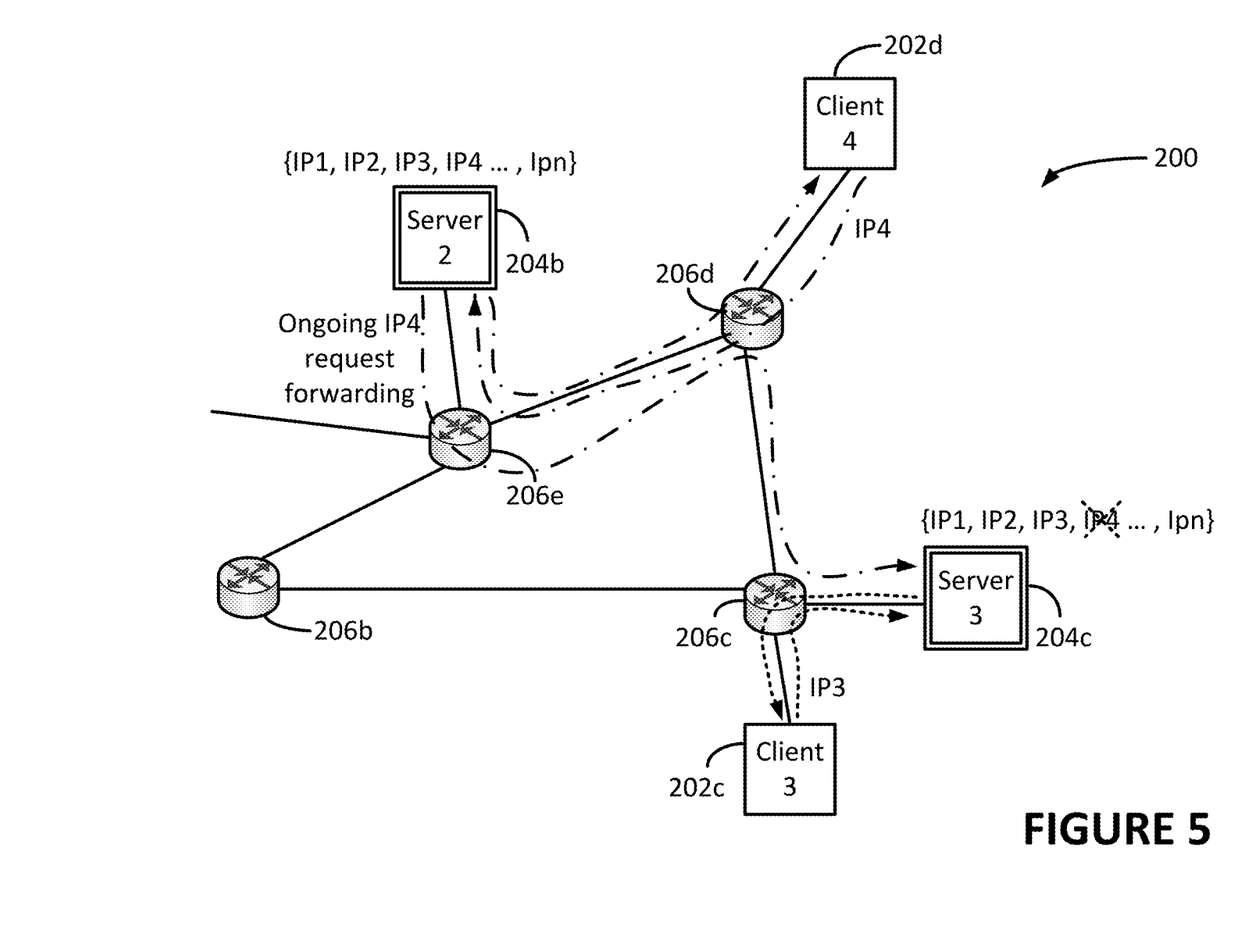
FIG. 5 shows an approach for preserving the state of on-going queries.

FIG. 5 shows an approach for preserving the state of on-going communications or transactions. In particular, FIG. 5 shows a portion of the network 200 shown in FIG. 4, in which the server-3 204c has ceased to advertise the anycast IP address IP4, and requests from the client-4 202d addressed to IP4 are routed to server-2 204b. The server-2 204b maintains a state table of all requests being processed by the servers 204a-204c. When the re-routed request from client-4 202d is received by the server-2 204b, the server-2 204b looks up the state table to determine whether the received request is new, corresponds to an existing ongoing transaction at the server-2 204b, or is associated with a different server that has recently ceased to advertise an address.

A state table can be maintained by each of the three servers 204a-204c. In some implementations, to maintain the state table, each of the three servers 204a-204c can communicate state and identification information of ongoing transactions with their respective clients to all other servers. Upon receiving such information, each of the three servers 204a-204c can update their respective state table. In some implementations, when a server ceases to advertise one or more anycast IP addresses, the server can communicate the one or more anycast IP addresses to the other servers. In some implementations, each server can periodically send to all other servers the information of their respective ongoing transaction with clients. In some other implementations, in response to being instructed to cease advertising one or more anycast IP addresses, a server may send state information associated with on-going transactions using those anycast IP addresses.

As the request received from the client-4 202d is associated with server-3 204c, the server-2 204b encapsulates the request from client-4 202d and forwards the encapsulated request to the server-3 204c. In some implementations, the server-2 204b can send the encapsulated request to the server-3 204c at a unique IP address associated with the server-3 204c. In some implementations, the unique IP address can be the IP address that the server-3 204c uses for sending and receiving server maintenance or administration information. The server-3 204c examines the encapsulated request and looks up its own table to determine that the encapsulated request is part of an on-going transaction between the client-4 202d and the server-3 204c. The server-3 204c may then process the request and return a response back to the client-4 202d.

In some implementations, the server-3 204c may encapsulate the response and send the encapsulated response back to server-2 204b, which, in turn, forwards the response back to the client-4 202d. This encapsulated exchange of on-going requests and responses may continue until the transaction that the requests and responses are part of is terminated by either the client-4 202d or the server-3 204c.

Thus, the server-3 204c, despite not being able to receive any packets addressed to anycast address IP4, can still process on-going transactions with the client-4 202d.

Figure 6:
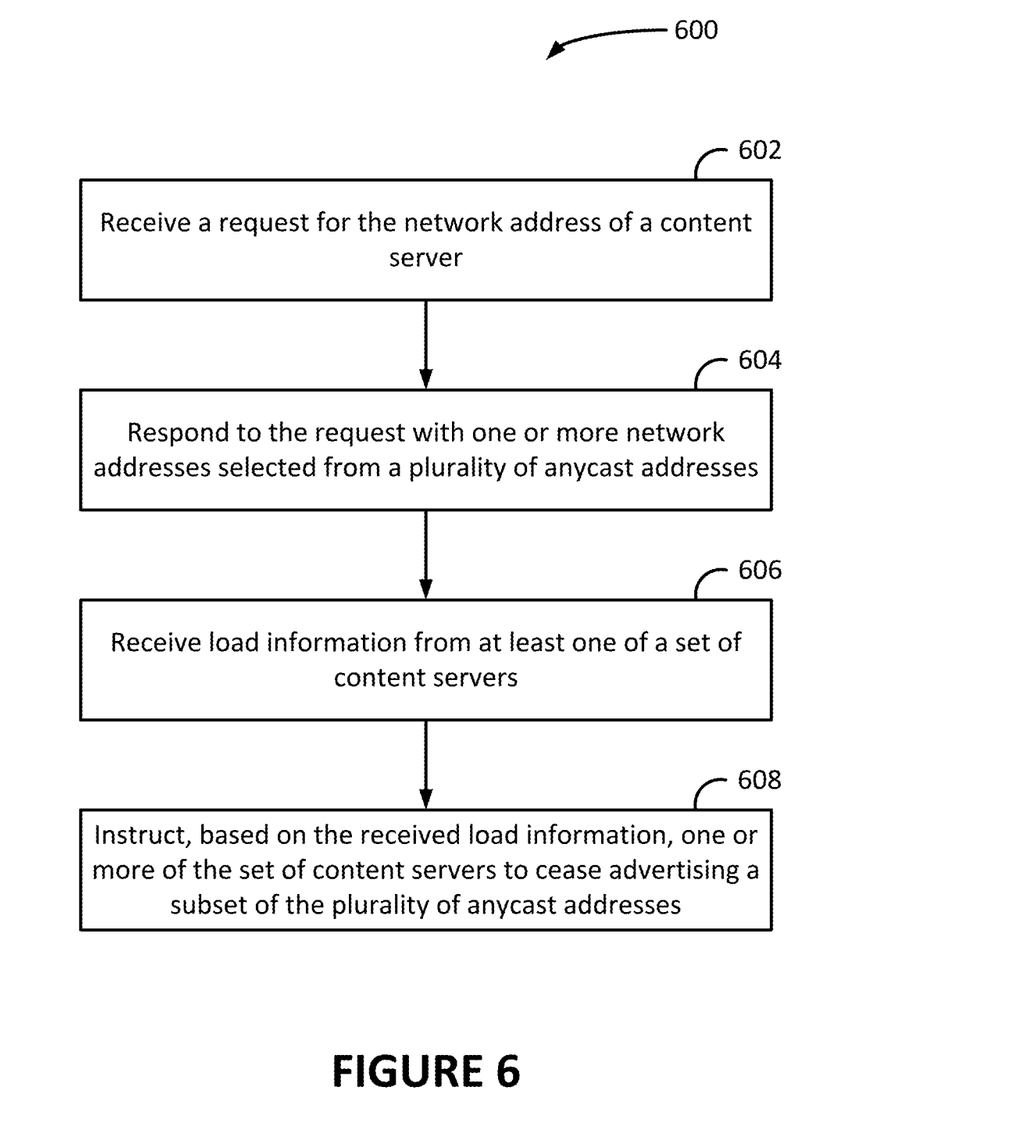
FIG. 6 shows an example process for anycast based load balancing performed by a DNS server.

FIG. 6 shows an example process 600 for anycast based load balancing performed by a DNS server. In some implementations, the process 600 shown in FIG. 6 can be executed by, for example, the DNS server 108 shown in FIG. 1. In some other implementations, the process 600 can be executed by, for example, the DNS server 208 shown in FIGS. 2-5. The process 600 includes receiving a request for the network address of a server (step 602), responding to the request with one or more anycast network addresses selected from a plurality of anycast addresses (step 604), receiving load information from at least one the servers (step 606), and instructing, based on the received load information, one or more of the servers to cease advertising one or more anycast addresses out of the plurality of anycast addresses (step 608).

The process 600 includes receiving a request for the network address of a server (step 602). One example of this process step has been discussed above in relation with FIG. 1. In particular, the DNS server 108 receives a request for the network address associated with the domain name address "www.example.com" from client-1 102a via the DNS Resolver-1 104a. The process 600 also includes responding to the request with one or more anycast network addresses selected from a plurality of anycast addresses (step 604). One example of this step has been discussed above in relation to FIG. 1. In particular, FIG. 1 shows the DNS server 106 responding with an anycast address IP1 to the request received from the client-1 102a. The anycast address IP1 can be selected from a set of N anycast IP addresses: {IP1, IP2, IP3, IP4, . . . , IPN}. In some implementations, the DNS server 106 may respond with more than one anycast addresses selected from the set of N anycast IP addresses.

The process 600 further includes receiving load information from at least one the servers (step 606). One example of this step has been discussed above in relation to FIGS. 3-5. For example, the DNS server 208 in FIGS. 3-5 receives load information from each of the three servers 204a-204b. As mentioned above, the load information may include several metrics such as, but not limited to, server response time, number of hits, resource utilization, latency, server status, etc. The DNS server 208, can compare the load information received from the servers and compare them with predetermined threshold values. If the received load information crosses the threshold values, then the DNS server 208 can determine that the server is under over-load condition.

The process 600 also includes instructing, based on the received load information, one or more of the servers to cease advertising one or more anycast addresses out of the plurality of anycast addresses (step 608). One example of this process step has been discussed above in relation to FIG. 4. For example, the DNS server 208 upon determining that server-3 204c is under over-load condition, instructs the server-3 204c to cease advertising the anycast address IP4, out of the set of N anycast addresses: {IP1, IP2, IP3, IP4, . . . , IPN} being advertised by the server-3 204c.

Figure 7:
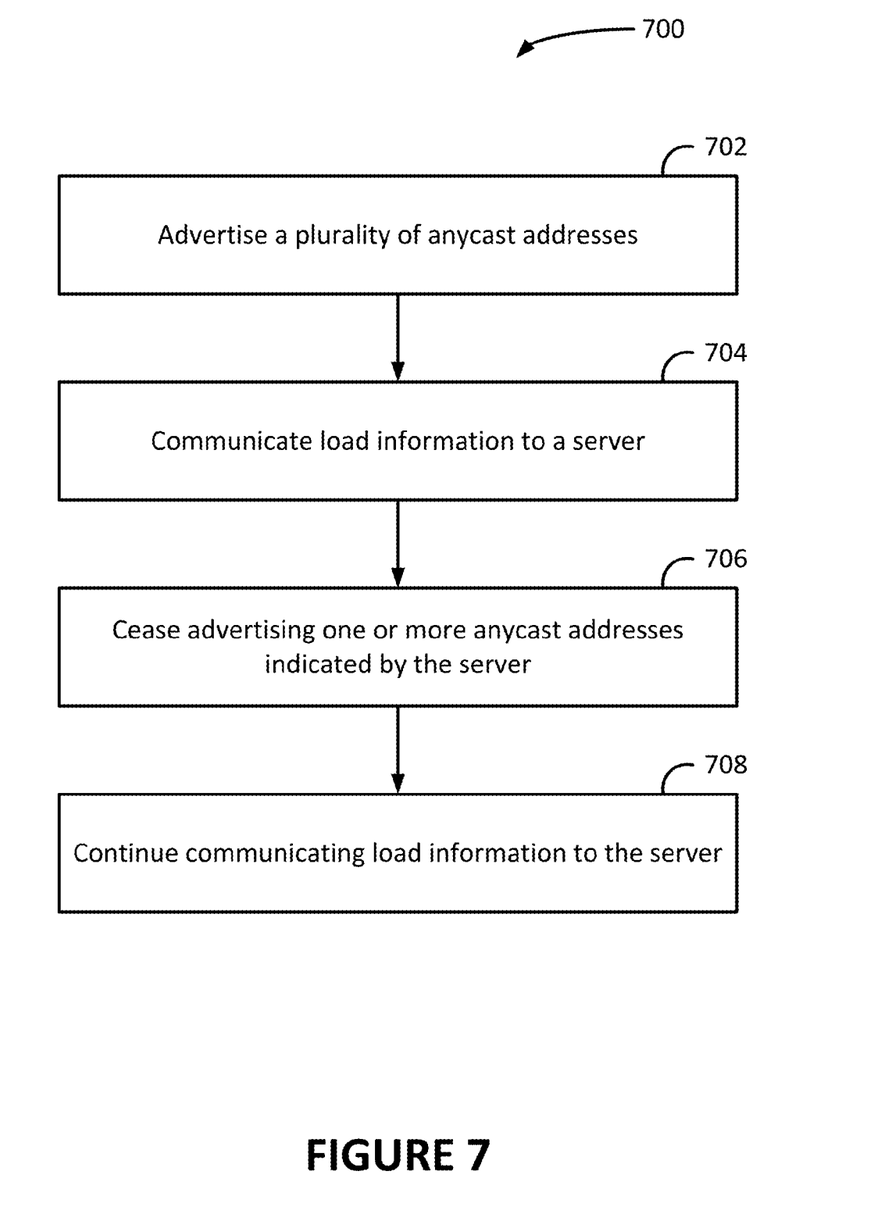
FIG. 7 shows an example process for anycast based load balancing performed by a server.

FIG. 7 shows an example process 700 for anycast based load balancing performed by a server. In some implementations, the process 700 shown in FIG. 7 can be executed by the servers 204a-204c shown in FIGS. 3-5. The process 700 includes advertising a plurality of anycast addresses (step 702), communicating load information to a server (step 704), ceasing advertising one or more anycast addresses indicated by the server (step 706), and continuing to communicate load information to the server (step 708).

The process 700 includes advertising a plurality of anycast addresses (step 702). One example of this process step has been discussed above in relation to FIG. 3. For example, FIG. 3 shows each of the three servers 204a-204c advertising a set of N anycast IP addresses {IP1, IP2, IP3, IP4, . . . , IPN}. By advertising the set of N anycast IP addresses, the servers 204a-204c indicate to the routers 206a-206e that each of the three servers 204a-204c can accept client requests addressed to any of the N anycast IP addresses.

The process 700 also includes communicating load information to a server (step 704). One example of this process step has been discussed above in relation to FIGS. 4-5. For example, each of the three servers 204a-204c shown in FIG. 4 sends load information to the DNS server 208. The load information can include load metrics such as, but not limited to, server response time, number of hits, resource utilization, latency, server status, etc.

The process 700 further includes ceasing advertising one or more anycast addresses indicated by the server (step 706). One example of this process step has been discussed above in relation to FIGS. 4-5. For example, as shown in FIG. 4, the server-3 204c, upon receiving instructions from the DNS server 208, ceases to advertise the anycast address IP4. By ceasing to advertise the anycast address IP4, the server-3 204c indicates that the server-3 204c is no longer accepting requests addressed to the anycast address IP4. This means that requests, and in effect packets, addressed to IP4 that were previously processed by the server-3 204c are instead routed to a different server.

The process 700 also includes continuing to communicate load information to the server (step 708). One example of this process step has been discussed above in relation to FIGS. 4-5. For example, as mentioned above, the server-3 204c continues to send load information to the DNS server 208 even after it ceases to advertise the anycast address IP4. If the DNS sever, based on the currently received load information, determines that the server-3 204c is no longer overloaded, then the server-3 204c may receive instructions from the DNS server 208 to begin re-advertising the anycast address IP4. In this manner, the server-3 204c can resume accepting and responding to requests addressed to the anycast address IP4.

Figure 8:
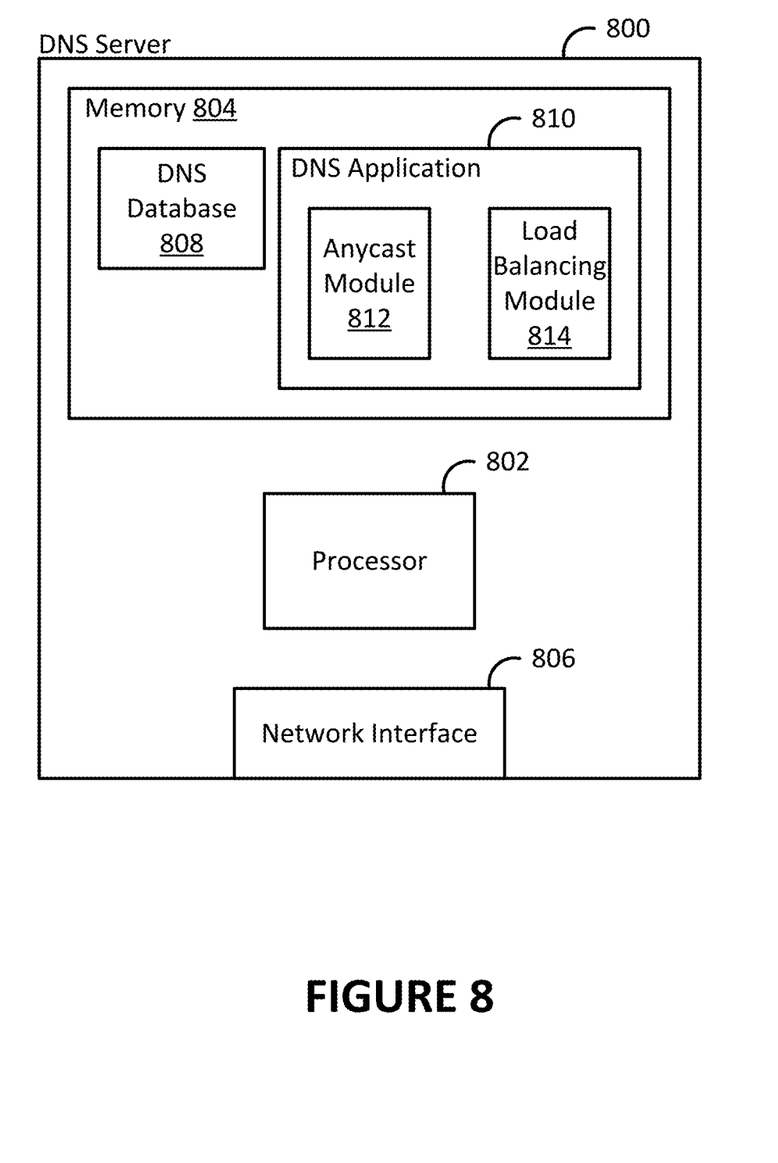
FIG. 8 shows an example block diagram of a DNS server.

FIG. 8 shows an example block diagram of a DNS server 800. In some implementations, the DNS server 800 can be utilized as, for example, the DNS server 106 shown in FIG. 1 and/or the DNS server 208 shown in FIGS. 2-4. In some implementations, the DNS server 800 can be utilized for executing the example process 600 shown in FIG. 6.

The DNS server 800 includes a processor 802, memory 804, and a network interface 806. The processor 802 can include any logic circuitry that processes instructions such as, but not limited to, microprocessors, microcontrollers, programmable logic arrays, etc., implemented as application specific integrated circuits (ASICs), field programmable gate arrays (FPGAs), etc. In some implementations, the processor 802 may include multiple processors. The processor 802 can be capable of multi-processing, multi-tasking, multi-threading, and generally be capable of concurrently executing more than on application. The processor 802 can communicate with the memory 804 and the network interface 806 via data and control buses (not shown).

The memory 804 can be any device capable of storing computer readable data. The memory 804 may be a device with fixed storage or a device for reading removable storage media. Examples include all forms of non-volatile memory, media and memory devices, semiconductor memory devices (e.g., EPROM, EEPROM, and flash memory devices), magnetic disks, magneto optical disks, and optical discs (e.g., CD ROM, DVD-ROM, and Blu-Ray® discs). The DNS server 800 may have any number of devices implementing memory 804. In some implementations, the memory 804 may include redundant array of independent disks (RAID) to improve fault-tolerance, availability, and reliability.

The DNS server 800 can utilize the network interface 806 for communicating data with other computing devices over a network. For example, the network interface can be used communicate with clients 102a-102n and/or DNS resolvers 104a-104n shown in FIG. 1. The DNS server 800 can also utilize the network interface 804 to communicate with servers 201a-201c shown in FIGS. 2-5. The network interface 806 can include one or more network ports for physically connecting to one or more networks via network cables. The network interface 806 may also include an interface controller for communicating data between the network ports and the processor 802 and for generally controlling the operation of the network interface 806. In some implementations, the network interface 804 can implement several network layers of the Open Systems Interconnection (OSI) network model. For example, the network interface can include Ethernet ports with assigned Ethernet addresses for implementing a data link layer.

In some implementations, the memory 804 can store a DNS database 808. The DNS database 808 can be similar to the DNS database discussed above in relation to the DNS server 106 shown in FIG. 1. For example, the DNS database 808 can include resource records having IP addresses of one or more web servers associated with a domain name such as "www.example.com." In some other implementations, the DNS database 808 can include IP addresses of other DNS servers that can process DNS requests on behalf of the DNS server 800. In some implementations, the IP addresses stored in the DNS database can be anycast IP addresses.

The memory 804 can store several applications for execution by the processor 802. For example the memory 804 can include a DNS application 810 for performing various functions related to the domain name system. In particular, the DNS application can include an anycast module 812, which can be executed by the processor 802 to provide clients (such as 102a-102n shown in FIG. 1) one or more anycast IP addresses selected form a plurality of anycast addresses stored in the DNS database 808. The DNS application 810 can also include a load balancing module 814. The load balancing module 814 can be executed by the processor 802 to process load information received from servers (such as servers 204a-204c shown in FIGS. 2-5) and to send instructions to the servers with regards to the advertising of anycast IP addresses. For example the load balancing module 814 can include instructions for communicating to an over-loaded server to cease advertising one or more anycast IP addresses.

Figure 9:
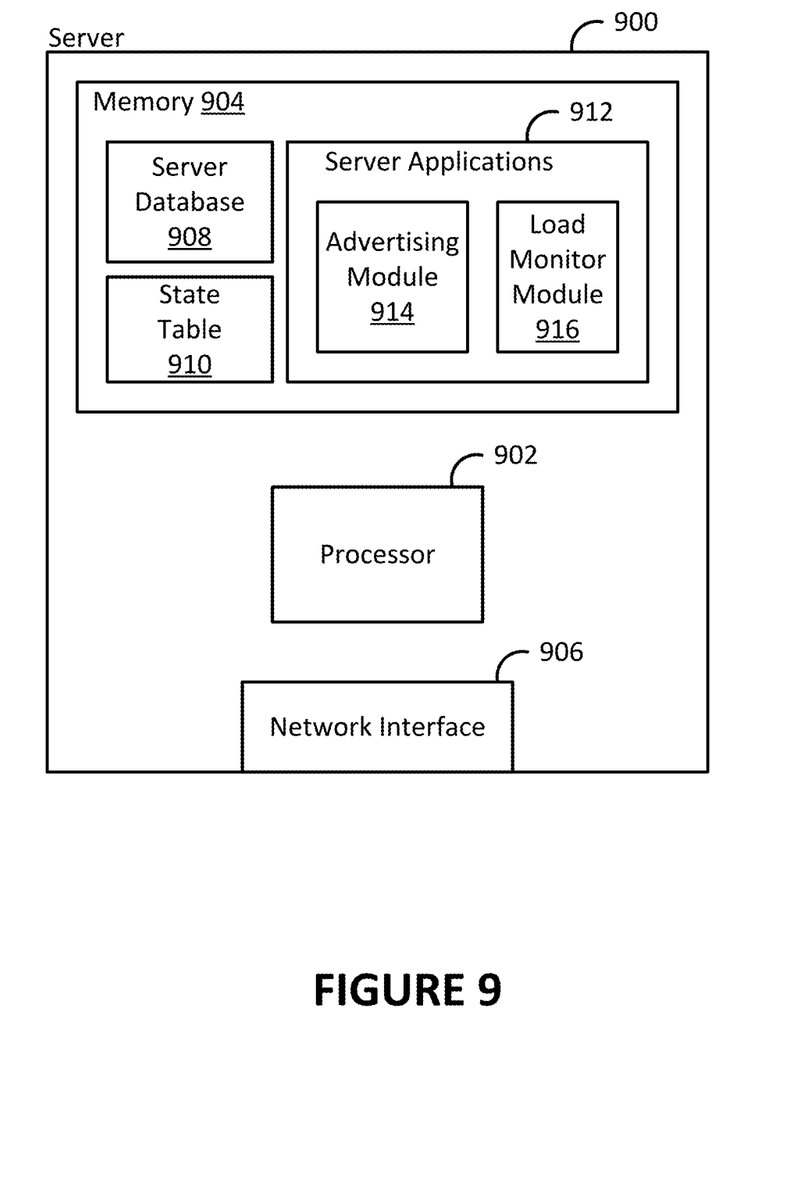
FIG. 9 shows an example block diagram of a server.

FIG. 9 includes an example block diagram of a server 900. In some implementations, the server 900 can be utilized as, for example, the content servers 204a-204c shown in FIGS. 2-5. In some implementations, the server 900 can be utilized for executing the example process 700 shown in FIG. 7.

The server 900 can include a processor 902, memory 904, and a network interface 906. In some implementations, the processor 902, the memory 904, and the network interface 906 can be implemented in a manner similar to that discussed above in relation to the processor 802, the memory 804, and the network interface 806, respectively, shown in FIG. 8.

The memory 904 can store a server database 908, which can include, for example, a plurality of anycast IP addresses associated with one or more domain names. The memory 904 can also include a state table 910, which can include state information of on-going transactions being processed by the servers that are participating in the domain name system.

The memory 904 can also include several applications for execution by the processor 902. For example, the memory 904 can include a server application 912, which can be executed by the processor 902 for performing various server operations related to the domain name system. In particular, the server application 912 can include an advertising module 914 and a load monitoring module 916. The advertising module 914 can be executed by the processor 902 for determining which of the anycast IP addresses stored in the server database 908 need to be advertised. In some implementations, the advertising module 914 can be used to communicate with the DNS server 800 shown in FIG. 8 for receiving instructions indicating which of the anycast IP addresses are to be advertised or un-advertised.

The load monitoring module 916 can be executed by the processor 902 for determining load information on the server and communicating the load information to the DNS server. For example, the load monitoring module 916 can collect information such as, but not limited to, server response time, number of hits, resource utilization, latency, etc. The load information collected by the load monitoring module 916 can be communicated to the DNS server, such as, for example, the DNS server 800 shown in FIG. 8. In some implementations, the load monitoring module 916 can include instructions to periodically collect load information or to collect load information when requested by the DNS server.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A method of balancing load over a set of content servers from a domain name system (DNS) server, comprising:
    receiving, at a DNS server, a request for a network address of a content server associated with a domain name;
    responding to the request with a network address selected from a plurality of anycast network addresses associated with the domain name;
    receiving, at the DNS server, load information from at least one of a plurality of content servers associated with the domain name; and
    instructing, by the DNS server based on the received load information, one or more over-loaded content servers of the plurality of content servers to cease advertising one or more of the plurality of anycast network addresses.

2. The method of claim 1, wherein responding to the request with the network address selected from the plurality of anycast network addresses includes selecting the network address from the plurality of anycast network addresses in a round robin fashion.

3. The method of claim 1, wherein responding to the request with the network address selected from the plurality of anycast network addresses includes randomly selecting the network address from the plurality of anycast network addresses.

4. The method of claim 1, further comprising instructing remaining content servers of the plurality of content servers to forward received in-progress requests that are associated with the one or more over-loaded content servers to the one or more over-loaded content servers.

5. The method of claim 1, further comprising receiving additional load information from the over-loaded content servers and instructing, based on the additional load information, the over-loaded content servers to resume advertising the one or more of the plurality of anycast network addresses.

6. A method of responding to communications received at a content server from one or more client computers within a network, comprising:
receiving, at a content server from a domain name system (DNS) server, a plurality of anycast network addresses associated with a domain name;
advertising the plurality of anycast network addresses to a network;
sending load information to the DNS server; and
ceasing to advertise an anycast network address of the plurality of anycast network addresses based on an instruction received from the DNS server.

7. The method of claim 6, further comprising:
receiving, at the content server, a request from a client addressed to an advertised one of the plurality of anycast network addresses;
maintaining state information associated with the request; and
communicating the state information to a second content server that is configured to advertise the anycast network address.

8. The method of claim 6, further comprising:
receiving, at the content server, a request from a second client addressed to the anycast network address;
encapsulating the request; and
forwarding the encapsulated request to a second content server based on state information associated with the request received from the second content server.

9. The method of claim 8, further comprising determining that the request is part of an in-progress transaction between the client and the second content server.

10. The method of claim 8, further comprising:
receiving, at the content server, a communication from the second content server in response to the encapsulated request; and
forwarding the communication to the client.

11. A domain name system (DNS), comprising:
a DNS server including:
an anycast module configured to
accept a request for a network address of a content server associated with a domain name, and
respond to the request with a network address selected from a plurality of anycast network address associated with the domain name,
a load balancing module, communicably coupled to the anycast module, configured to:
receive load information from at least one of a plurality of content servers associated with the domain name to identify an over-loaded content server based on the load information, and
instruct the over-loaded content server to cease advertising one or more of the plurality of anycast network addresses, and
a plurality of content servers capable of communicating with the DNS server, each of the plurality of content servers including:
an advertising module configured to:
receive instructions from the DNS server to advertise an anycast network address of the plurality of anycast network addresses, and
advertise the anycast network address, and
a load monitoring module configured to:
collect load information associated with the content server, and
communicate the load information to the DNS server.

12. The system of claim 11, wherein the anycast module is further configured to select the network address in a round-robin fashion from the plurality of anycast network addresses.

13. The system of claim 11, wherein the load balancing module is further configured to receive additional load information from the over-loaded content server, and instruct the over-loaded content server to resume advertising the one or more of the plurality of anycast network addresses.

14. The system of claim 11, wherein each of the plurality of content servers is further configured to
receive a request from a client addressed to the anycast network address,
maintain state information associated with the request, and
communicate the state information to a second content server configured to advertise the anycast network address.

15. The system of claim 11, wherein each of the plurality of content servers is further configured to:
receive a request from a client addressed to the anycast network address;
encapsulate the request: and
forward the encapsulated request to a second content server based on state information associated with the request received from the second content server.

16. A non-transitory computer readable storage medium having instructions encoded thereon, which when executed by a processor cause the processor to perform a method comprising:
receiving, at a DNS server, a request for a network address of a content server associated with a domain name;
responding to the request with a network address selected from a plurality of anycast network addresses associated with the domain name;
receiving, at the DNS server, load information from at least one of a plurality of content servers associated with the domain name; and
instructing, by the DNS server based on the received loan information, one or more over-loaded content servers of the plurality of content servers to cease advertising one or more of the plurality of anycast network addresses.

17. The non-transitory computer readable storage medium of claim 16, wherein responding to the request with the network address selected from the plurality of anycast network addresses includes selecting the network address from the plurality of anycast network addresses in a round robin fashion.

18. The non-transitory computer readable storage program of claim 16, wherein responding to the request with the network address selected from the plurality of anycast network addresses includes randomly selecting the network address from the plurality of anycast network addresses.

19. The non-transitory computer readable storage medium of claim 16, further comprising instructing remaining content servers of the plurality of content servers to forward received in-progress requests that are associated with the one or more over-loaded content servers to the one or more over-loaded content servers.

20. The non-transitory computer readable storage medium of claim 16, further comprising receiving additional load information from the over-loaded content servers and instructing, based on the additional load information, the over-loaded content servers to resume advertising the one or more of the plurality of anycast network addresses.

* * * * *